United States Patent Office 3,078,227
Patented Feb. 19, 1963

1

3,078,227
CUTTING AND GRINDING COMPOSITION
Frank J. Zauner and Jerome M. Hommen, Milwaukee,
Wis., assignors to Rolz-On, Inc., Milwaukee, Wis., a
corporation of Wisconsin
No Drawing. Filed Mar. 23, 1960, Ser. No. 16,921
4 Claims. (Cl. 252—25)

The present invention relates generally to improvements in cutting and grinding compounds, and this application is a continuation-in-part of our copending application Serial No. 782,321, filed December 22, 1958, and now abandoned.

A primary object of the invention is to provide an improved composition particularly adapted for use with high speed steel cutting tools and grinders in working on all types of ferrous or non-ferrous metals, alloys and synthesized materials such as carbide or the like.

In machining metals, alloys and synthesized materials, it is essential that precautionary measures be taken to prevent overheating and reduce friction to a minimum in the zone being machined. Failure to properly cool and lubricate the tool and the work in the vital areas may cause loss of temper in the tool due to overheating. Consequently, the tool will dull rapidly causing rough and scored surfaces and inaccurate dimensions in the work, and frequent additional sharpening maintenance is therefore required which, of course, shortens the life expectancy of the tool. Furthermore, such overheating often causes the tool and the part being machined to fuse or bind, thus directly resulting in breakage of one or the other. Obviously, all of these things greatly increase manufacturing costs.

In efforts to overcome the costly problems, various lubricating compositions have heretofore been proposed and employed. Such lubricants are normally applied at the cutting edges of such tools as drills, reamers, end mills, tool bits, broaches, taps and the like in the zone being worked. In some instances, the lubricating composition is applied constantly by means of pumps or similar devices, and in cases wherein the metal working machines are not equipped with such devices, the lubricant is applied manually by the operator and at his or her discretion.

To properly equip a machine with suitable lubricant conveying and applying apparatus is, of course, costly. Furthermore, considerable attendant plumbing in the way of piping, fittings, tanks, valves and control mechanism is necessary, all of which adds bulk to the machine and requires additional maintenance. Moreover, when the application of lubricant or coolant is performed manually and within the operator's discretion, human error caused by various distractions, normal and abnormal interruptions, fatigue, negligence, or the like, frequently occurs.

Due to the fact that such lubricants as are presently commercially available do not possess sufficient thermal stability to retain their lubricating and cooling qualities within the wide ranges and high temperatures encountered during the machining operations, they burn and disperse rapidly. In addition, these prior lubricants lack the ability to adhere to the metal surfaces of the tool and the work, and constant application thereof in considerable quantities is an absolute necessity. The lack of thermal stability and poor adherence are naturally emphasized when machining certain materials possessing qualities or characteristics requiring especially high speed cutting operations and with which extremely high temperatures are encountered.

In grinding operations on extremely hard synthesized materials, the present practice is to use diamond impregnated tools which are usually fabricated by the machinist who is to perform the grinding operation. The fabrication of the impregnated rod or tool is performed by rolling and pounding an end portion of a soft metal rod in a pile of fine granular diamond chips referred to as diamond dust. The impregnating process must normally be frequently repeated during the grinding operation because the diamond dust wears away and is lost. Consequently, there are many interruptions in the grinding process which is therefore time consuming, and the diamond dust used is moreover very costly and cannot be retrieved for re-use.

It is accordingly a further object of our present invention to provide an improved compound or composition which may be used to advantage in cutting as well as grinding operations to obviate the disadvantages heretofore attendant such machining operations.

Another object of this invention is to provide an improved cutting and grinding composition which possesses a natural affinity for metal and is adapted to adhere tenaciously to the metal surfaces of the tool and work.

Still another important object of the invention is to provide an improved cutting and grinding composition which has extremely good slip and lubricating qualities to thereby effectively minimize friction and resultant resistance between the tool and the work.

An additional important object of the present invention is to provide an improved cutting and grinding compound which has excellent thermal stability enabling it to retain its lubricity throughout wide temperature ranges and at exceedingly high heats.

By reason of our improved cutting and grinding composition, a longer tool life may be obtained at minimum expense, machining operations may be greatly accelerated at a reduced cost, and high quality finishes may be imparted to the machined surfaces.

We have discovered that a greatly improved cutting and grinding composition results through the use of molybdenum disulfide ($MoS_2$) as the basic ingredient. Molybdenum disulfide is a mineral which resembles graphite in appearance, and for use in the improved composition, it may be reduced to a powdered or finely crushed state by a suitable crushing operation. It has a natural affinity for tenacious adherence to metal surfaces and additionally possesses good lubricating qualities. These qualities are assumed to be a result of its unique molecular structure wherein it appears that each lamina of the compound is composed of a layer of molybdenum atoms having a layer of sulfur atoms on each side. Presumably, strong atomic bonds between sulfur and metal causes the tendency for adherence to metal surfaces, whereas the other laminae (molybdenum) slip easily due to the weakness of the sulfur-to-sulfur bond. Molybdenum disulfide is the primary source for molybdenum which has a melting point of 4,748 degrees Fahrenheit, and the compound is therefore thermally stable, retaining its lubricity from minus 300 degrees Fahrenheit to 750 degrees Fahrenheit in air and up to 2,000 degrees Fahrenheit in the absence of air.

The improved composition consists generally of molybdenum disulfide ($MoS_2$) in finely crushed or powder form, a suitable vehicle such as a combination of carnauba plant wax and beeswax adapted to keep the molybdenum disulfide in even suspension, and a suitable thinner such as a machine oil or mineral oil added as required to obtain the desired consistencies.

While the amounts of the various ingredients can be varied somewhat depending upon the type of operation and the material being worked, we have found that excellent results are obtainable in cutting operations through use of a mixture comprising equal parts by volume of molybdenum disulfide (MoS$_2$) powder and carnauba plant wax to eight parts by volume of beeswax with a number ten machine oil or a mineral oil added until the desired consistency is obtained for the particular job. The carnauba plant wax was selected because of its durability, and when mixed with beeswax, a plastic hydrocarbon compound, an excellent vehicle is provided for keeping the molybdenum disulfide in even suspension.

In preparing the compound, the carnauba plant wax, beeswax and number ten machine oil or mineral oil, as the case may be, are melted together to the boiling point, and this mixture is agitated and stirred during the addition of the molybdenum disulfide powder. The agitation is continued during cooling until the composition has cooled to a stable consistency. This combination of ingredients and the continuous agitation during the process constantly keeps the molybdenum in even suspension. This is a necessary factor in order to convey the molybdenum disulfide (MoS$_2$) to the proper surfaces of the work and to the cutting edges of the tools to which it adheres during the cutting operations. In use, the composition may be applied sparingly by brush or by any other suitable applicator.

The improved cutting composition may be advantageously utilized with high speed cutting tools for working on all types of ferrous or non-ferrous metals and alloys of soft and moderate hardness up to 38 or 40 RC. When machining different types of material, the proper feed and speed, as obtained from available advanced machinist books and charts, should be maintained. In actual tests, we have experienced increased tool life and higher quality finish to the machined surfaces over any other types of compounds, oils or waxes known by us to be presently used or commercially available. Lengthy experiments with the improved compound in drilling, reaming, milling, shaping, planing, broaching and tapping operations on almost all known types of metals and alloys, ferrous and non-ferrous, and including aluminum brass, copper, bronze, zinc, cold rolled steel, hot rolled steel, water hardened tool steel (in soft state), air hardened tool steel (in soft state), oil hardened tool steel (in soft state), stainless steels, and semi-hardened steels and alloys up to 38–40 RC, have met with highly successful results.

Molybdenum disulfide (MoS$_2$) also provides the basic ingredient in our grinding composition which is especially designed for grinding holes in extremely hard synthesized materials such as carbide, Carboloy and the like. However, in our grinding composition, we prefer to add a semi-refined and finely crushed molybdenite ore and diamond dust or the equivalent to our cutting composition as above described. The ore used contains approximately fifteen percent molybdenum disulfide (MoS$_2$), and the remainder consists of siliceous elements of a granitic substance such as quartz, chalcedony, flint, mica, felspar or the like which aids in the even distribution of the diamond dust along with the other ingredients of our composition.

In the preparation of the grinding composition, we preferably melt seventy parts by volume of the cutting composition to the melting point, and while agitating and stirring this mixture, twenty-four parts of semi-refined, finely crushed or powdered molybdenite ore containing approximately fifteen percent molybdenum disulfide (MoS$_2$) is added along with six parts of diamond dust in this order, and the agitation is continued until the compound has cooled to a stable consistency. In lieu of the molybdenite ore, other suitable siliceous elements containing the required amount of refined powdered molybdenum disulfide (MoS$_2$) may be used, and if the molybdenum disulfide content of the ore is variable, sufficient molybdenum disulfide powder (MoS$_2$) or siliceous elements may be added as required to maintain the fifteen percent specified.

The grinding composition may be used by applying the same in a suitable manner to a plain soft steel rod. With the speed for revolving the work with the head chuck or jig being referred to as head speed and spindle speeds being referred to as rod speed, the recommended speeds when using the improved composition are as follows. For hole sizes ranging from $\frac{1}{32}$ inch to $\frac{1}{8}$ inch in diameter, the recommended head speed is 100 to 125 r.p.m., and the recommended spindle speed is at least 7,000 r.p.m. For hole sizes of $\frac{1}{8}$ inch to one inch in diameter, the recommended head speed is 100 to 125 r.p.m. with a spindle speed of at least 3,900 r.p.m.

By using a plain soft steel rod with the improved composition, we have found that grinding operations can be successfully performed many times faster than by the customary impregnated rod method. Furthermore, we have found that most of the improved grinding composition can be retrieved because of its adherence qualities and can be used repeatedly without appreciably losing its effectiveness. Due to the natural affinity of the molybdenum disulfide (MoS$_2$) for tenacious adherence to metal, the grinding composition adheres to and revolves with the rod, thus allowing the compound to work properly and causing the diamond dust particles to cut and grind freely without extensive wear on the rod. It has accordingly been found that replacements required due to wear are reduced materially as compared with present techniques, thereby effecting savings in time on the part of the operator. As in the case of the cutting compound, the consistency of the grinding composition may be varied as desired by adding or subtracting the quantity of oil therein.

In the foregoing description, we have exemplified the proportions of the various ingredients in parts by volume, using a full teaspoon as a measure for each part. To translate parts by volume to parts by weight, we offer the following table:

|  | Grams |
| --- | --- |
| One part (teaspoon) carnauba plant wax | 1.85 |
| One part (teaspoon) beeswax | 1.85 |
| One part (teaspoon) No. 10 machine oil | 4.45 |
| One part (teaspoon) MoS$_2$ in powder form | 3.36 |
| One part (teaspoon) crushed molybdenite ore | 6.73 |
| One part (teaspoon) diamond dust | .214 |

We have also found that the formulation of the basic cutting composition can be varied within certain limits depending upon the consistency desired and the type of work being performed, the ranges or limits being as follows:

|  | Parts by Volume, teaspoons | Parts by Weight, grams |
| --- | --- | --- |
| Carnauba wax | 1 to 3 | 1.85 to 5.55. |
| Beeswax | 9 to 10 | 14.60 to 18.50. |
| No. 10 oil | 23 to 20 | 102.35 to 89.00. |
| MoS$_2$ | 1 to 3 | 3.36 to 10.03. |

As a specific example of a cutting and grinding compound in semi-fluid form especially suitable for use in small and relatively light work, we heat 1.85 grams by weight of carnauba plant wax with 14.80 grams by weight beeswax and 103.81 grams by weight of a number ten machine oil to the boiling point. These ingredients are agitated and stirred as 3.36 grams by weight of molybdenum disulfide (MoS$_2$) is added, and this agitation and stirring is continued to maintain the molybdenum disulfide (MoS$_2$) in even suspension as the mixture is slowly cooled. Large quantities of this formula can be produced as long as the indicated ratios are maintained. A formula producing a jelly or paste-like composition adapted for use in heavy duty machine work consists of 3.07 grams by weight of carnauba plant wax, 18.50 grams by weight of beeswax and 89.00 grams by weight of a number ten machine oil heated to the boiling point and again agitated and stirred during the addition of 5.57 grams by weight molybdenum disulfide (MoS$_2$) during the slow cooling process.

It should be understood that it is not desired or intended to limit this invention to the exact formulas or uses herein described, since various modifications in the formulation and additional uses of the composition may occur to persons skilled in the art to which this invention pertains.

We claim:

1. A composition for use with cutting and grinding tools consisting essentially of a mixture of the following ingredients in the indicated relative proportions by weight:

| | Grams |
|---|---|
| Carnauba wax | 1.85–5.55 |
| Beeswax | 14.60–18.50 |
| No. 10 machine oil | 89.00–102.35 |
| Molybdenum disulfide | 3.36–10.08 |

2. A composition for use with cutting and grinding tools consisting essentially of a mixture of the following ingredients in the indicated relative proportions by weight:

| | Grams |
|---|---|
| Carnauba wax | 1.85–5.55 |
| Beeswax | 14.60–18.50 |
| Mineral oil equivalent to No. 10 machine oil | 89.00–102.35 |
| Molybdenum disulfide | 3.36–10.08 |

3. A composition for use with cutting and grinding tools consisting essentially of a mixture of the following ingredients in the indicated relative proportions by weight:

| | Grams |
|---|---|
| Carnauba plant wax | 1.85 |
| Beeswax | 14.80 |
| No. 10 machine oil | 102.35 |
| Molybdenum disulfide | 3.36 |

4. A composition for use with cutting and grinding tools consisting essentially of a mixture of the following ingredients in the indicated relative proportions by weight:

| | Grams |
|---|---|
| Carnauba wax | 3.07 |
| Beeswax | 18.50 |
| No. 10 machine oil | 89.00 |
| Molybdenum disulfide | 5.57 |

References Cited in the file of this patent

UNITED STATES PATENTS

| 115,293 | Forbes | May 30, 1871 |
| 280,134 | Colgan | June 26, 1883 |
| 2,325,180 | Egeberg | July 27, 1943 |
| 2,384,023 | Galstaun | Sept. 4, 1945 |
| 2,466,642 | Larsen | Apr. 5, 1949 |

FOREIGN PATENTS

| 975 of 1878 | Great Britain | Mar. 11, 1878 |